United States Patent
Thiesse et al.

(10) Patent No.: US 12,104,335 B2
(45) Date of Patent: Oct. 1, 2024

(54) SYSTEM AND METHOD FOR AUTOMATIC LOWERING OF A PAVING MACHINE SCREED ASSEMBLY

(71) Applicant: Caterpillar Paving Products Inc., Brooklyn Park, MN (US)

(72) Inventors: Chad M. Thiesse, Brooklyn Park, MN (US); Anthony Paul Steinhagen, Maple Grove, MN (US); Ricky Leon Mings, Oak Grove, MN (US); Ronald D. Wilson, Maple Grove, MN (US); Bryan J. Downing, Champlin, MN (US); Mathew Hedrington, Ham Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 638 days.

(21) Appl. No.: 17/353,026

(22) Filed: Jun. 21, 2021

(65) Prior Publication Data
US 2022/0403607 A1 Dec. 22, 2022

(51) Int. Cl.
| | |
|---|---|
| *E01C 19/42* | (2006.01) |
| *B60K 35/00* | (2006.01) |
| *B60K 35/22* | (2024.01) |
| *B60K 35/28* | (2024.01) |
| *E01C 19/48* | (2006.01) |

(52) U.S. Cl.
CPC .............. *E01C 19/42* (2013.01); *B60K 35/00* (2013.01); *B60K 35/22* (2024.01); *B60K 35/28* (2024.01); *B60K 2360/178* (2024.01); *E01C 19/4873* (2013.01)

(58) Field of Classification Search
CPC ...... E01C 23/07; E01C 19/42; E01C 19/4873; G06N 20/00; G06F 18/214; G01K 13/10
USPC ........ 404/72, 75, 77, 79, 84.05–85, 95, 117, 404/118
See application file for complete search history.

(56) References Cited

U.S. PATENT DOCUMENTS

| | | |
|---|---|---|
| 8,547,530 B2 | 10/2013 | Tan |
| 9,540,778 B2 | 1/2017 | Rutz |

(Continued)

FOREIGN PATENT DOCUMENTS

EP 3650602 A1 5/2020

*Primary Examiner* — Raymond W Addie

(57) ABSTRACT

A paving machine includes a tractor portion, a screed assembly, a lifting assembly configured to move the screed assembly from a raised position to a lowered position, an operator interface configured to receive input from an operator, and a control module. The tractor portion includes a plurality of tractor sensors configured to detect the presence of an object in a detection zone. The screed assembly is configured to be towed behind the tractor portion, and includes a plurality of screed sensors configured to detect the presence of an object in a detection zone. The control module is configured to receive a 'lower screed' input from the operator interface, receive a plurality of signals from the plurality of tractor sensors and the plurality of screed sensors, determine if an object is present in the detection zone based on the plurality of signals, automatically prevent or halt lowering of the screed assembly and direct the operator interface to display a warning if an object is detected, and direct the lift assembly to lower the screed assembly to the lowered position if no object is detected.

19 Claims, 6 Drawing Sheets

(56) References Cited

U.S. PATENT DOCUMENTS

| | | | |
|---|---|---|---|
| 10,458,076 B2 | 10/2019 | Marsolek | |
| 10,480,131 B1* | 11/2019 | McAlpine | E01C 19/004 |
| 10,640,943 B2* | 5/2020 | Marsolek | E02D 3/046 |
| 2001/0022919 A1* | 9/2001 | Bruns | B05B 15/52 |
| | | | 404/90 |
| 2017/0182954 A1* | 6/2017 | Fais | B60K 35/00 |
| 2019/0106846 A1* | 4/2019 | Marsolek | G08G 1/096708 |
| 2020/0019192 A1* | 1/2020 | O'Donnell | E01C 19/264 |
| 2020/0025662 A1* | 1/2020 | O'Donnell | G05D 1/021 |
| 2020/0089230 A1* | 3/2020 | Oetken | E02F 9/205 |

* cited by examiner

SYSTEM AND METHOD FOR AUTOMATIC LOWERING OF A PAVING MACHINE SCREED ASSEMBLY

TECHNICAL FIELD

The present disclosure relates generally to paving machines, and more specifically to screed assemblies for paving machines.

BACKGROUND

When constructing roads, bridges, parking lots and other such surfaces, paving machines may be used to deposit, spread and compact paving material, such as asphalt, on a base surface, thereby creating a flat, consistent surface over which vehicles will travel. A paving machine generally includes a tractor portion having a chassis and a hopper for storing the paving material, an auger that distributes the paving material on a base surface and a screed assembly that levels and compacts the paving material, ideally leaving a mat of uniform depth and smoothness. The screed assembly is typically rear-mounted on the paving machine behind the hopper, the chassis and the auger relative to the direction of travel. Further, the screed assembly is typically drawn behind the paving machine by a pair of pivotally mounted tow arms.

Among other things, the screed assembly may include a main screed and one or more extension screeds. The extension screeds are laterally extendable from the main screed to adjust for varying base surface widths. In addition, the main screed and the extension screeds may each include bottom-facing screed plates that facilitate the compacting and leveling of the paving material on the base surface. Further, the screed assembly may include other components and systems, such as leveling arms, vibrators, tamper bars, shimming plates, side plates, hydraulic cylinders, stairs, walkways, sensors, controllers, as well as additional components known to those skilled in the art. These many screed assembly components contribute to the relatively heavy weight of screed assemblies.

When not paving, the screed assembly may be raised away from the road surface for travel. As a result, the screed assembly must be lowered into position before each paving operation can take place. Because the screed assembly is large and heavy, it is essential that the area beneath and around the screed must be clear of objects. In particular, the screed assembly must not be lowered if operators or other persons are at risk. In most typical machines, the screed assembly is lowered manually by an operator. However, in order to save time, minimize operator error, and maximize safety, a automatic lowering system may be advantageous in many circumstances.

Some paving machines incorporate automatic control systems: for example, as described in U.S. Pat. No. 10,458,076 to Marsolek et al. The Marsolek patent teaches a control system which uses sensors to identify an edge line of a surface to be paved and automatically control the direction of the paver. However, the control system of Marsolek does not include automatically lowering the screed assembly. Therefore, there remains a need for a system and method for safely and automatically lowering a screed assembly.

SUMMARY OF THE DISCLOSURE

According to one aspect of the present disclosure, a paving machine is disclosed. The paving machine includes a tractor portion, a screed assembly, a lifting assembly, an operator interface, and a control module. The tractor portion includes a plurality of tractor sensors configured to detect the presence of an object in a detection zone. The screed assembly is configured to be towed behind the tractor portion, and includes a plurality of screed sensors configured to detect the presence of an object in a detection zone. The lifting assembly is configured to move the screed assembly from a raised position to a lowered position. The operator interface is configured to receive input from an operator. The control module is configured to receive a 'lower screed' input from the operator interface, receive a plurality of signals from the plurality of tractor sensors and the plurality of screed sensors, determine if an object is present in the detection zone based on the plurality of signals, automatically prevent or halt lowering of the screed assembly and direct the operator interface to display a warning if an object is detected, and direct the lift assembly to lower the screed assembly to the lowered position if no object is detected.

According to another aspect of the present disclosure, a method of automatically lowering a screed assembly of a paving machine is disclosed. The method includes receiving a 'lower screed' input from an operator interface, receiving a plurality of signals from a plurality of sensors, and determining if an object is present in a detection zone based on the plurality of signals. If an object is detected, automatically preventing lowering of the screed assembly, and directing the operator interface to display a warning if an object. If no object is detected, lowering the screed assembly to a lowered position.

According to yet another aspect of the present disclosure, a system for automatically lowering a screed assembly of a paving machine is disclosed. The system includes a lifting assembly, a plurality of sensors configured to detect the presence of an object in a detection zone, an operator interface configured to receive input from an operator, and a control module. The control module is configured to receive a 'lower screed' input from the operator interface, receive a plurality of signals from the plurality of sensors, and determine if an object is present in the detection zone based on the plurality of signals. If no object is detected, the control module directs the lifting assembly to lower the screed assembly to a lowered position. If an object is detected, the control module automatically stops lowering of the screed assembly, and directs the operator interface to display a warning.

These and other aspects of the present disclosure will be more readily understood after reading the following detailed description in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Although the presently disclosed lowering systems are shown in operative association with the screed assembly of a paving machine, it should be understood that the similar systems may be incorporated where needed on any suitable work machine.

Figure 1:
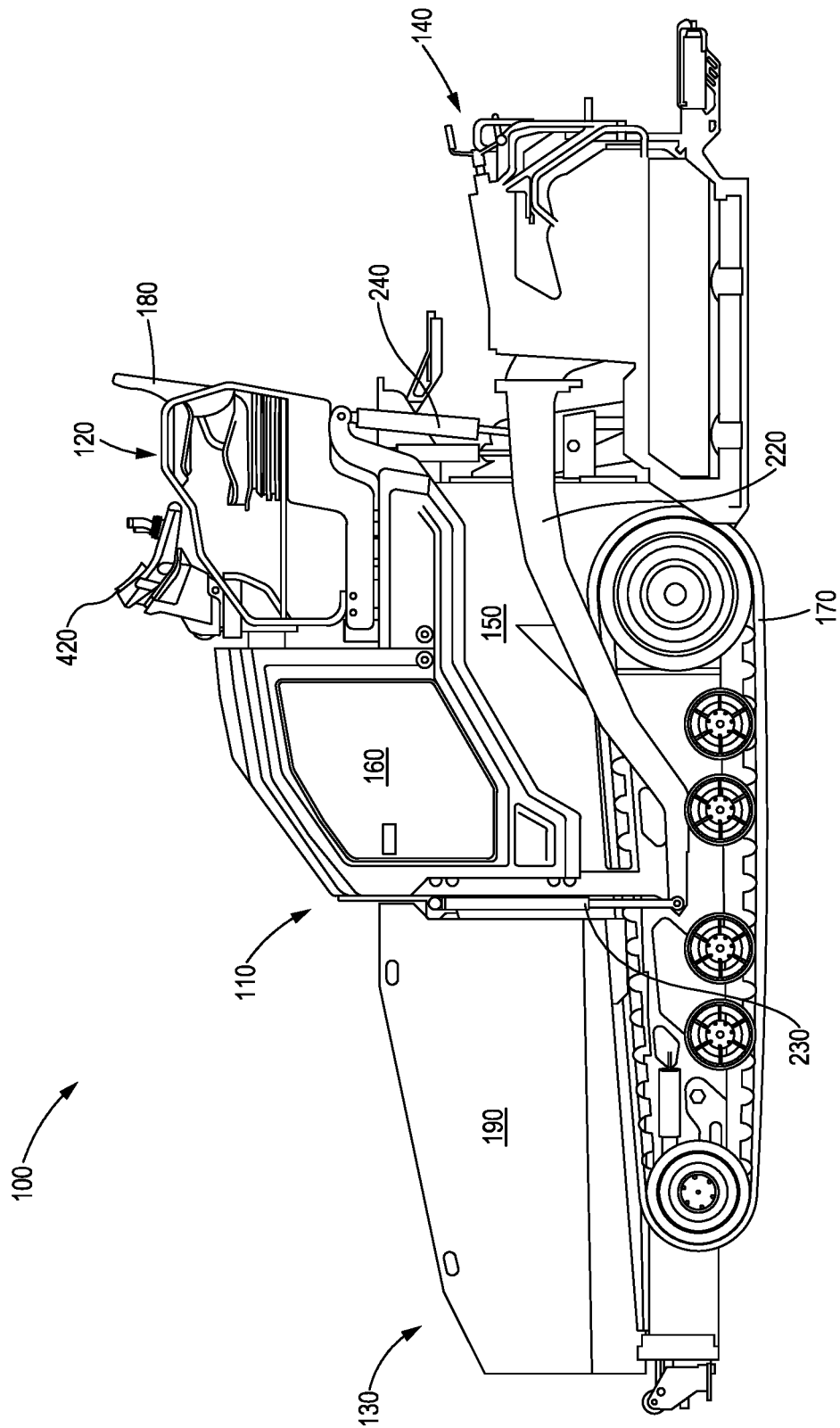
FIG. 1 is a side view of a paving machine with a screed assembly in a lowered position, according to one aspect of the present disclosure.
Figure 2:
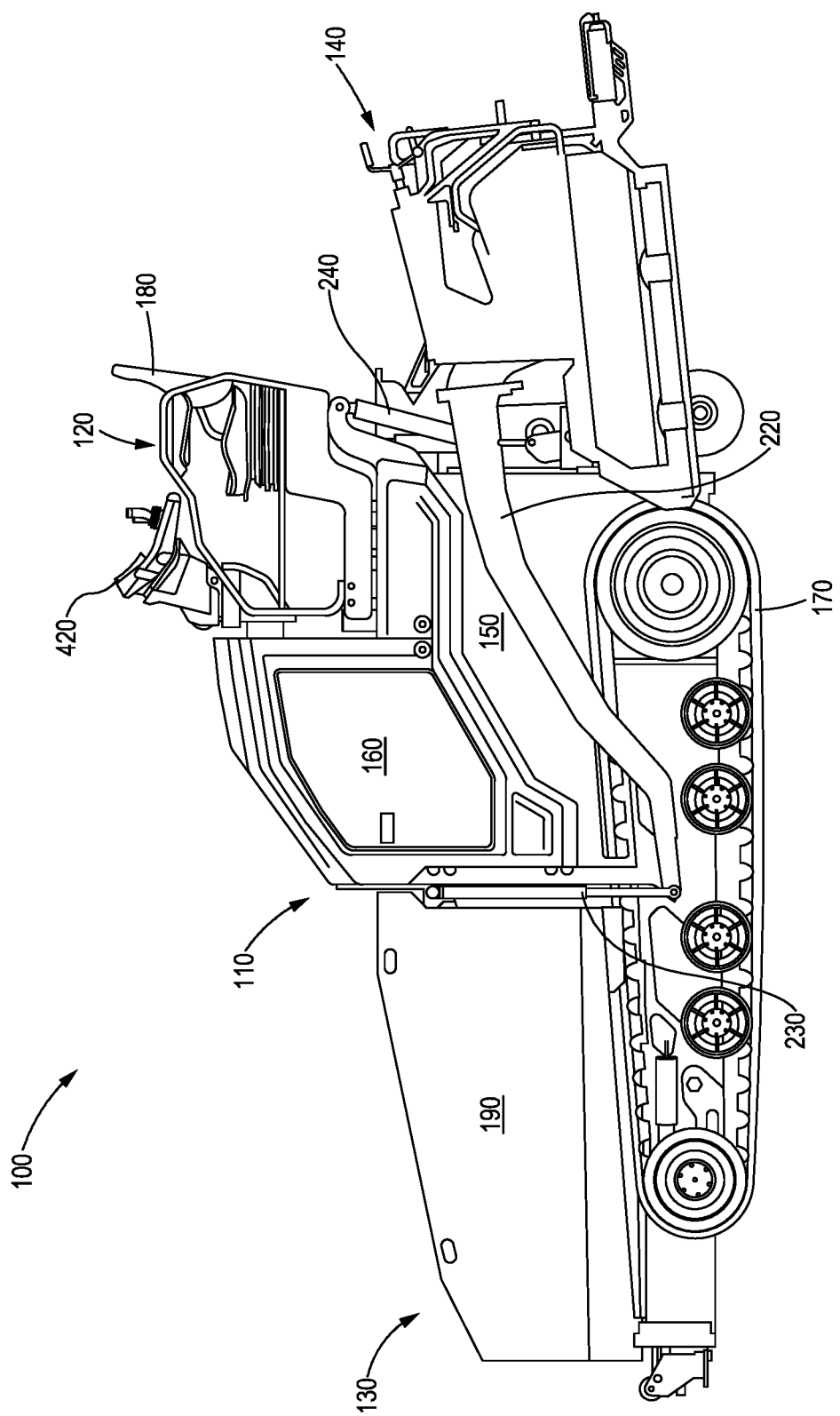
FIG. 2 is a side view of the paving machine of FIG. 2 with the screed assembly in a raised position.

Referring now to the drawings and with specific reference to FIGS. 1-2, a side view of an exemplary paving machine is shown and referred to by reference numeral 100. The paving machine 100, which may also be referred to as an asphalt paver, may be any machine used to distribute a layer of paving material on a surface of a roadway or other area.

The paving machine 100 generally includes a tractor portion 110 which propels the paving machine and supports an operator control station 120, an asphalt conveyor system 130, and a screed assembly 140. The tractor portion 110 propels the paving machine 100 at a steady rate along a paving surface and includes a frame 150, an engine 160 supported by the frame 150, and ground engaging elements 170 supporting the frame 150 and driven by the engine 160. The ground engaging devices 170 may be tracks as shown, or any other similar device such as wheels.

The operator control station 120 may be configured to provide operator control over the paving machine 100. The operator station 120 may include one or more operator seats 180. In one embodiment, the operator station 120 may be mounted to the frame 150 proximal to the rear of the tractor portion 110.

The asphalt conveyor system 130 is configured to transfer hot asphalt material or other paving material from a truck in front of the paving machine 100, through the tractor portion 110, to the road surface at the rear of the tractor 110. A hopper 190 may be positioned at the front of the paving machine 100 and may contain the paving material that is to be formed into a mat on the road surface. The paving material may be dumped into the hopper 190 from trucks (not shown) that deliver the paving material to a worksite. The paving machine 100 may also include one or more conveyors 200 (not shown) at the bottom of the hopper 190. The conveyors 200 transport the paving material from the hopper 190 to the rear of the tractor portion 110. The paving machine 100 may further include one or more augers 210 (not shown) or other material feed components instead of or in addition to the conveyors 200. The augers 210 distribute the paving material in front of the screed assembly 140 positioned at the rear end of the tractor portion 110. As the paving machine 100 travels forward, the paving material is evenly spread and compacted by the screed assembly 140.

The screed assembly 140 may be pivotably attached to the tractor portion 110 by a tow arm 220 on each side of the frame 150 and towed behind the tractor portion 110 to spread and compact the paving material into a layer or mat of desired thickness, width and uniformity. The tow arms 220 are pivotally connected to each side of the frame 110 such that the relative position and orientation of the screed assembly 140 relative to the frame 110 and to the surface being paved may be adjusted by raising or lowering the tow arms 220 via tow arm actuators 230. The tow arm actuators 230 may be any suitable actuators, such as, for example, the hydraulic cylinders depicted.

The screed assembly 140 may also be connected to the tractor portion 110 by a lifting assembly 240. The lifting assembly 240 is configured to move the screed assembly 140 between a lowered position (shown in FIG. 1) and a raised position (shown in FIG. 2). The raised position allows the paving machine 100 to move more easily when the paving functions are not required. In the lowered position, the screed assembly 140 is able to perform its flattening and compacting function. The lowered position may be the lowest position possible as set by the ground surface or mechanical stops, or it may be a desired height above the lowest point as required for a particular use of the paving machine. That height may be set by the operator and measured by height sensors.

The lifting assembly 240 may include a plurality of lift cylinders or other actuators connected to the top of the screed assembly. In some embodiments, the lift cylinders may also provide further control over the paving process by applying additional downward force to the screed assembly 140.

Figure 3:
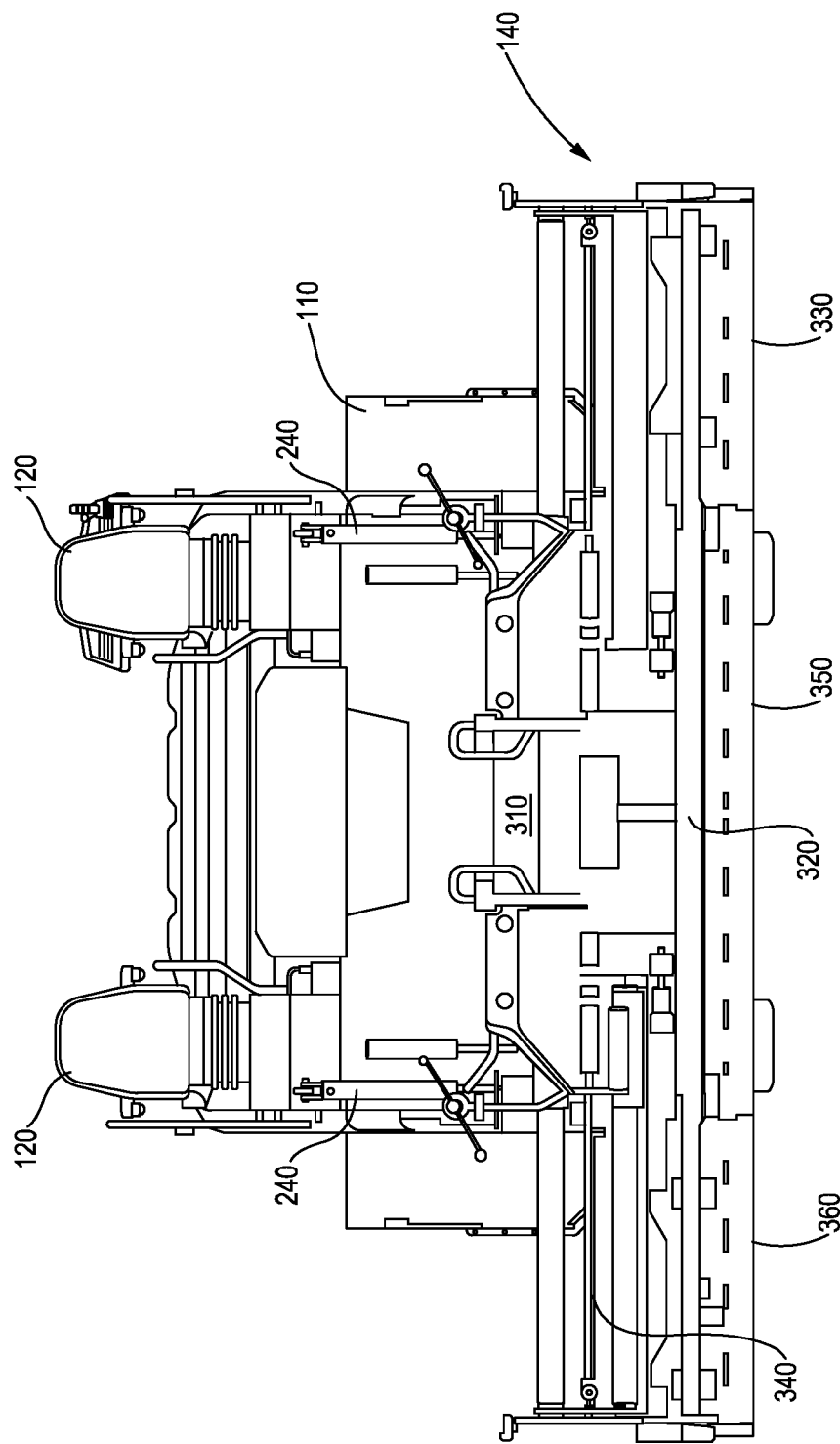
FIG. 3 is a rear view of the screed assembly and paving machine of FIG. 1.

The screed assembly 140 may be a compilation of components that cooperate to shape, level, and compact an asphalt mixture delivered from the hopper onto a base surface and may have any of a number of configurations known in the industry. FIG. 3 depicts an exemplary screed assembly 140. The screed assembly 140 may include a main frame 310, a main screed 320, and one or more extension screeds 330 that extend laterally from the main screed 320 when in use. The main frame 310 of the screed assembly 140 may be operatively connected to the tractor portion frame 150 via the tow arms 220 and lifting assembly 240. The extension screeds 330 may be moved in-and-out relative to the main screed 320 by way of one or more hydraulic actuators 340, so as to adjust a width of the resulting layer of asphalt laid down by the screed assembly 140 as needed for a particular paving job. It should be noted, however, that in other embodiments the extension screeds 330 may be omitted.

The main screed 320 may include a main screed plate 350. In operation, the main screed plate 350 will smooth and compress paving material as the screed assembly 140 (and the main screed 320) is floatingly pulled by the paving machine 100 over the paving material. The main screed plate 350 may be comprised of a single plate as illustrated, or a plurality of connected plate sections. The extension screeds 330 may similarly each include an extension screed plate 360.

In some embodiments, the screed assembly 140 may be between 1 and 2 meters from front to back. The width of the screed assembly 140 depends on the size of the paver and the screed assembly. In some embodiments, the screed assembly may have a width of 1-6 meters without the extensions. The extensions screeds 330 may result in a screed assembly 140 with a width up to 10 meters.

The screed assembly 140 of the paving machine 100 may also include additional components and systems, such as, for example, tamper devices, leveling arms, vibrators, heating elements and walkways, as are known to those skilled in the art. Such additional systems and components are not within the scope of the present disclosure and, thus, will not be discussed herein in greater detail.

When not paving, the screed assembly 140 may be raised away from the road surface for travel. As a result, the screed assembly 140 must be lowered from a raised position, shown in FIG. 2, into a lowered position, shown in FIG. 1, before each paving operation can take place. In most typical paving machines 100, the screed assembly 140 is lowered manually by an operator. However, in order to save time, minimize operator error, and maximize safety, automation of this process may be advantageous in many circumstances. Because the screed assembly 140 is large and heavy, it is important that the area beneath and around the screed must be clear of objects. Therefore, the present disclosure includes a system for automatically lowering a screed assembly 140, depicted in FIG. 4 and referred to by reference numeral 400.

Figure 4:
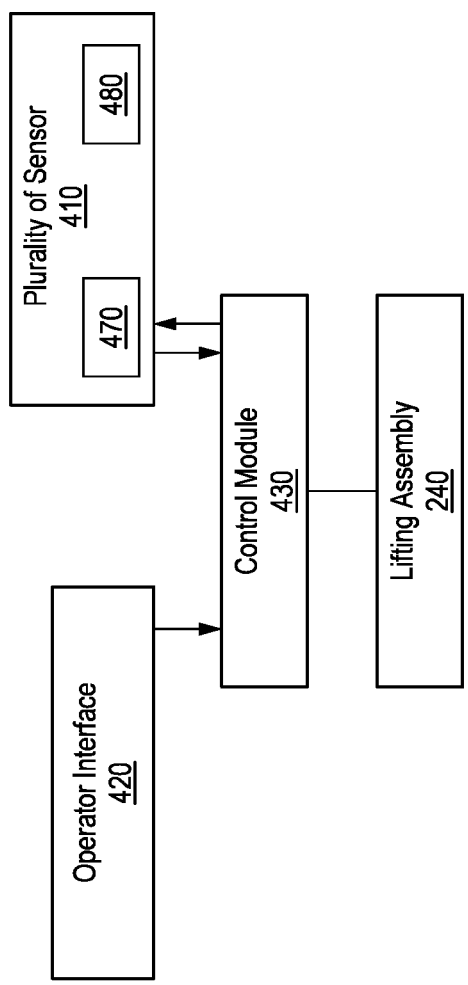
FIG. 4 is a block diagram of a system for automatically lowering a screed assembly, according to one aspect of the present disclosure.

As shown in FIG. 4, the system 400 includes the lifting assembly 240 previously described, a plurality of sensors 410 configured to detect objects in a detection zone, an operator interface 420, and a control module 430.

Figure 5:
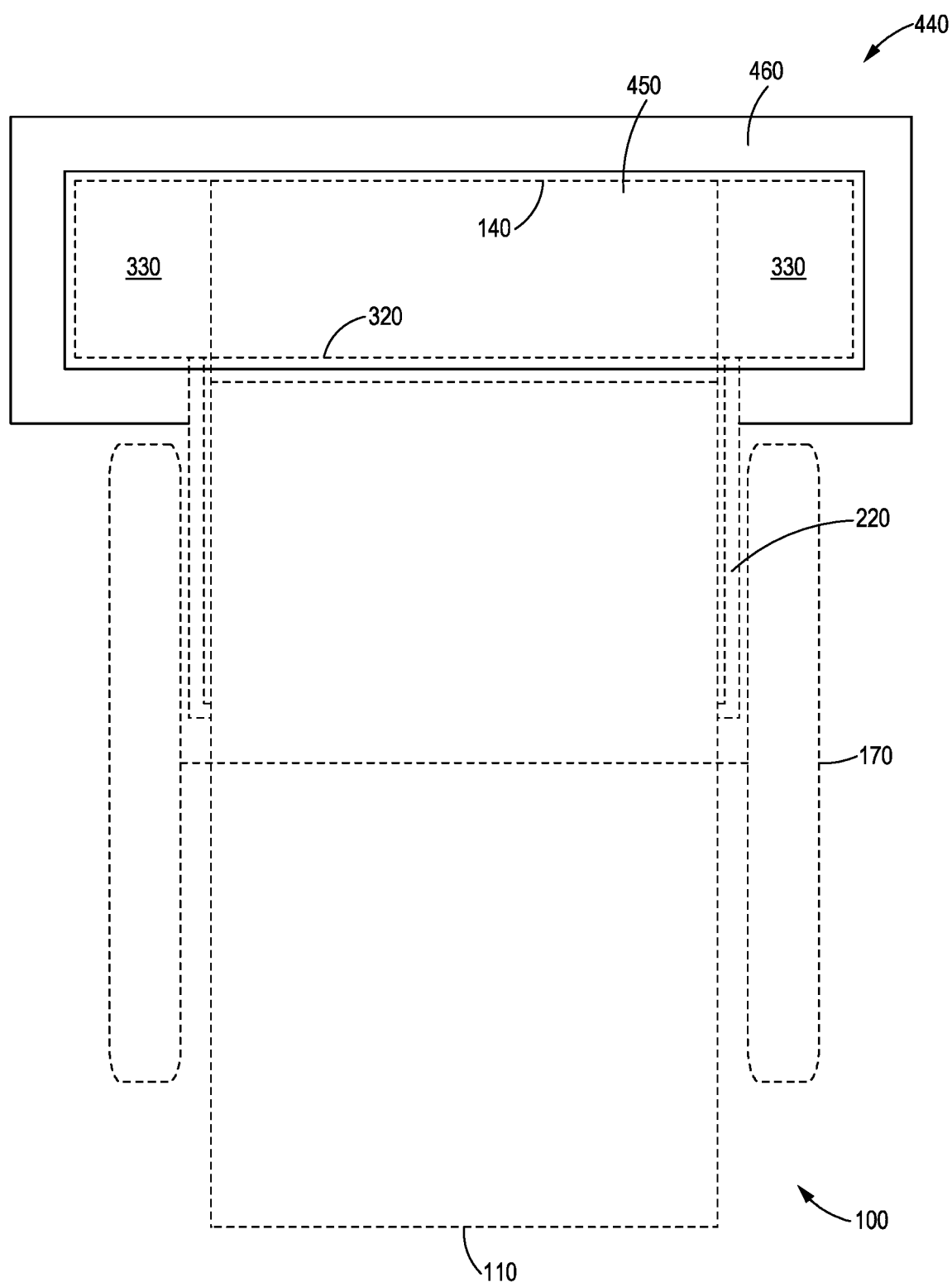
FIG. 5 is a diagram of a detection zone relative to a screed assembly, according to one aspect of the present disclosure.

The detection zone 440 may include a primary zone 450 and a perimeter zone 460. As shown in FIG. 5, the primary zone 450 encompasses the region immediately below the raised screed assembly 140 into which the screed assembly 140 will be lowered. The size of the primary zone 450 will depend on the size of the paving machine 100 and the screed assembly. In some embodiments, the primary zone 450 may be 2 meters long and 1-10 meters wide. The size of the primary zone 450 may be adjustable by the operator to cover the extension screeds 330 if extended.

The perimeter zone 460 encompasses a zone around the primary zone 450 to the sides and rear of the screed assembly 140. The perimeter zone 460 aids the system in detecting the presence of operators or other persons near the lowering screed assembly 140 who may otherwise get caught beneath. In some embodiments, the perimeter zone 460 may add an additional space of between 0 and 12 inches around the primary zone 450, although of course, other widths are possible. The size of the perimeter zone 460 may be adjustable by the operator. In some embodiments, the perimeter zone 460 may be set at a different width on different sizes of the screed assembly 140. This would accommodate situations in which the paving machine 100 is operating near a required obstacle such as a curb.

The plurality of sensors 410 may include a plurality of tractor sensors 470 positioned on the tractor portion 110 and a plurality of screed sensors 480 positioned on the screed assembly 140. One or more of the tractor sensors 470 may be mounted above the rear of the tractor portion 110 directed downwards to provide an overhead view of the screed assembly 140 and the perimeter zone 470. Other tractor sensors 470 may also be located at other positions towards the rear of the tractor portion 110. In some embodiments, the tractor sensors 470 may include cameras angled to provide an overhead view of the perimeter zone 460. In some other embodiments, the tractor sensors 470 may include thermal sensors. In addition, other types of sensors configured to detect an object may be used, including, but not limited to, infrared, sonic, magnetic and other technologies known in the art.

The screed sensors 480 may be mounted to the screed assembly 470, including but not limited to, the center 490 of the screed main frame 310, the sides 500 of the screed main frame 310, and/or the extension screeds 330. In order to not be impacted by the hot paving material, the screed sensors 480 may be mounted above the side of the main screed plate 350 and directed to detect below the screed assembly 140. Together, the screed sensors 480 are configured to detect an object in the primary zone 540 and may also detect an object in the perimeter zone 460. The screed sensors 480 may include cameras, thermal sensors, or other types of sensors configured to detect an object may be used, including, but not limited to, photoelectric, sonic, magnetic and other technologies known in the art.

The operator interface 420 may be positioned in the operator station 120 and configured to receive input from an operator and transmit that input to the control module 430. In particular, the interface 420 may receive and transmit a 'lower screed' input. The 'lower screed' input is a command that the screed assembly be lowered from the raised position to a lowered position.

In addition, the operator interface 420 may also be configured to provide a warning to the operator if an object is present. The warning may be an audible alarm, a visual notification such as a warning light, a message on a display screen, and/or any other suitable method of alerting the operator.

The control module 430 is configured to receive the 'lower screed' input from the operator interface 420 and a plurality of signals from the plurality of sensors 410. Receiving the 'lower screed' input triggers the control module 430 to determine whether an object is detected in the detection zone, based on the plurality of signals.

If no object is detected, the control module 430 directs the lifting assembly 240 to lower the screed assembly 140 to the lowered position. In some embodiments, the control module 430 may continue to receive the plurality of signals and determine if an object is present in the detection zone until the screed assembly 140 is at the lowered position. In some of these embodiments, the view of the sensors 140 directed at the primary zone 450 may be obscured during lowering. In that case, the control module 430 may determine if an object is present only in the perimeter zone 460 during the lowering process.

If an object is detected, the control module 430 stops the screed assembly 140 from lowering and directs the operator interface 420 to provide a warning. Following the warning, the operator may remove the obstacle and repeat the process. In some embodiments, the system may allow for the operator to override the warning. The override may require an acknowledgement input, or in some embodiments, repeating the 'lower screed' input may be used as an override.

INDUSTRIAL APPLICABILITY

Figure 6:
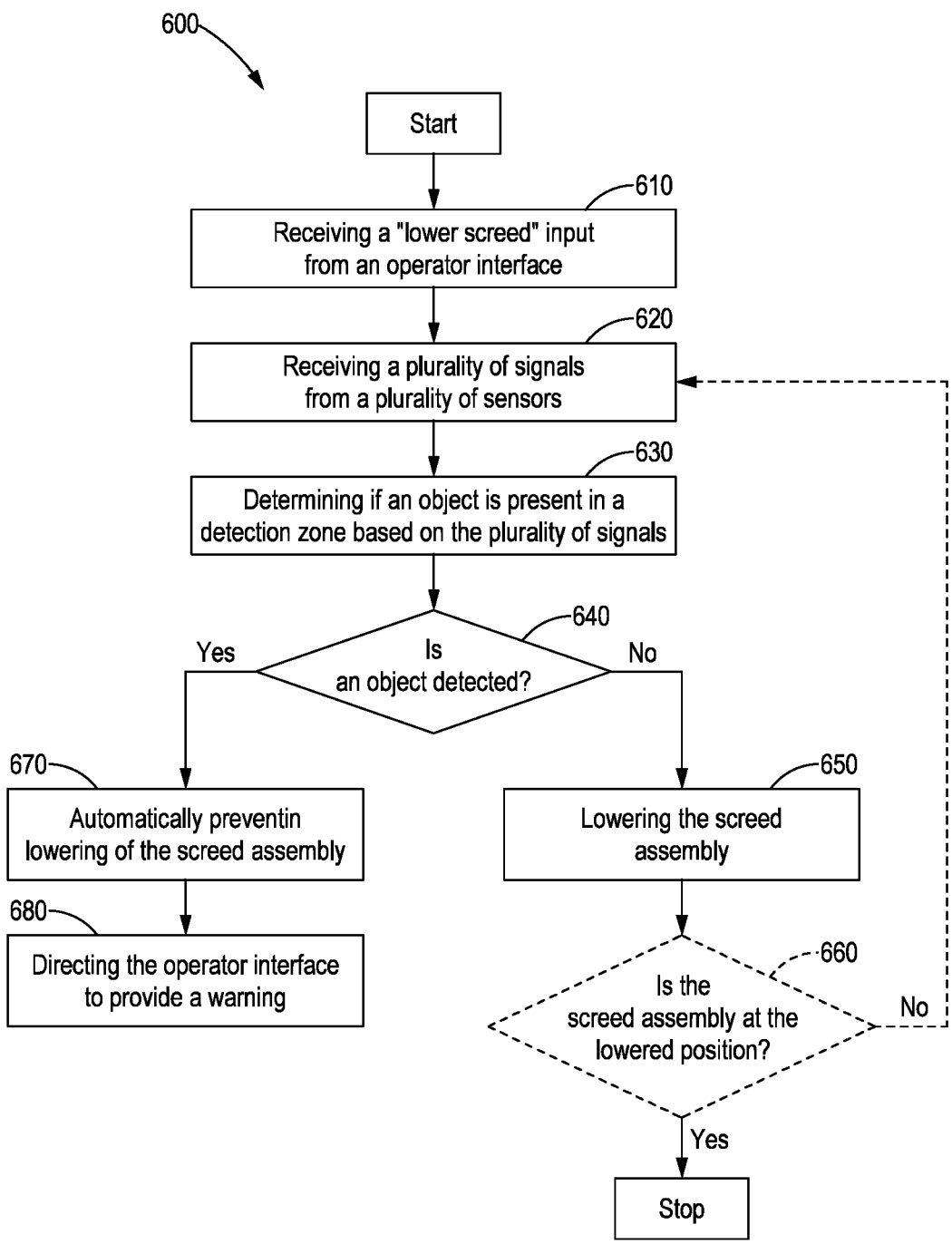
FIG. 6 is a flowchart of a method of operation, according to one aspect of the present disclosure.

In general, the present disclosure finds application in many different industries, including, but not limited to, earth moving equipment, construction, agriculture, mining, and the like. More specifically, the system 400 disclosed above, may be advantageous for any machine which automatically lowers a heavy component into a zone which may contain vulnerable objects or people. A method for operation of the system for automatically lowering with object detection is shown in FIG. 6.

The method 600 begins in block 610 when the control module 430 receives a 'lower screed' input from the operator interface 420. The input may be entered into the operator interface 420 by an operator.

The control module 430 also receives a plurality of signals from the plurality of sensors 420, as shown in block 620. Each of the plurality of sensors 420 is configured to detect an object present in a detection zone 440. Each sensor 420 may cover only a portion of the detection zone 440 individually. The detection zone 440 may include a primary zone 450 and a perimeter zone 460. The primary zone 450 encompasses the region immediately below the screed assembly 140. The perimeter zone 460 encompasses a perimeter around the screed assembly 140. The plurality of sensors 420 may include a plurality of tractor sensors 470 positioned on the tractor portion 110 and a plurality of screed sensors 480 positioned on the screed assembly 140. The sensors 410 may be of any type able to detect an object, including, but not limited to, cameras, thermal, infrared, sonic, magnetic and other technologies known in the art.

Based on the plurality of signals, the control module 430 determines if an object is present in the detection zone 440 (block 630 and decision block 640). If no object is detected, the screed assembly 140 will be automatically lowered to the lowered position, per block 650.

In some embodiments, the control module 430 may continue to receive the sensor signals and determine if an object is present in the detection zone 440 until the screed assembly 140 is at the lowered position, as shown in optional block 660.

If an object is detected in the detection zone 440, the control module 430 will automatically stop the screed assembly 140 from lowering, as shown in block 670. In addition, a warning will be provided at the operator interface 420 to alert an operator to the problem (block 680). The warning may be an audible alarm, a visual notification such as a warning light, a message on a display screen, and/or any other suitable method of alerting the operator.

Following the warning, the operator may remove the obstacle and repeat the process. In some embodiments, the system may allow for the operator to override the warning. The override may require an acknowledgement input, or in some embodiments, repeating the 'lower screed' input may be used as an override.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A paving machine, comprising:
    a tractor portion having:
        a frame,
        a traction system supporting the frame configured to move the tractor portion along a ground surface,
        an operator station supported by the frame, and
        a plurality of tractor sensors configured to detect the presence of an object in a perimeter zone;
    a screed assembly pivotably connected to the frame and configured to be towed behind the tractor portion, the screed assembly having:
        a screed frame,
        a plurality of screed sensors configured to detect the presence of an object in a primary zone comprising at least a region directly below the screed assembly;
    a lifting assembly configured to move the screed assembly from a raised position to a lowered position;
    an operator interface configured to receive input from an operator; and
    a control module configured to:
        receive a lower screed input from the operator interface,
        receive a plurality of signals from the plurality of tractor sensors and the plurality of screed sensors,
        determine if an object is present in the primary zone or perimeter zone based on the plurality of signals,
        automatically prevent or halt lowering of the screed assembly and direct the operator interface to display a warning if an object is detected, and
        direct the lift assembly to lower the screed assembly to the lowered position if no object is detected.

2. The system of claim 1, wherein the screed sensors are further configured to detect an object in the perimeter zone.

3. The machine of claim 1, wherein at least one of the plurality of tractor sensors is positioned to provide an overhead perspective of the perimeter zone.

4. The machine of claim 1, wherein at least one of the plurality of screed sensors is a thermal sensor.

5. The machine of claim 1, wherein at least one of the plurality of screed sensors is a camera.

6. The system of claim 1, wherein the screed assembly includes one or more extension screeds, the primary zone further including the regions directly below the extension screeds.

7. A method of automatically lowering a screed assembly of a paving machine, comprising:
    receiving a lower screed input from an operator interface;
    receiving a plurality of signals from a plurality of sensors;
    determining if an object is present in a detection zone, the detection zone including a primary zone and a perimeter zone, based on the plurality of signals, wherein the primary zone encompasses a region directly below the screed assembly and the perimeter zone encompasses an area around the primary zone; and
    lowering the screed assembly to a lowered position as long as no object is detected, wherein upon detection of an object within the detection zone, automatically stopping lowering of the screed assembly and directing the operator interface to display a warning.

8. The method of claim 7, wherein at least one of the plurality of sensors is located on the tractor portion.

9. The method of claim 7, wherein at least one of the plurality of sensors is located on the screed assembly.

10. The method of claim 7, wherein at least one of the plurality of sensors is a camera.

11. The method of claim 7, wherein at least one of the plurality of sensors is a thermal sensor.

12. The method of claim 7, wherein at least one of the plurality of sensors is positioned to provide an overhead perspective of the perimeter zone.

13. The method of claim 7, wherein the steps of receiving a plurality of signals from a plurality of sensors and determining if an object is present in a detection zone based on the plurality of signals are repeated until the screed assembly reaches the lowered position.

14. A system for automatically lowering a screed assembly of a paving machine, comprising:
    a lifting assembly configured to move the screed assembly between a raised position and a lowered position;
    a plurality of sensors configured to detect the presence of an object in a detection zone, the detection zone including a primary zone and a perimeter zone, the primary zone including an area under the screed assembly;
    an operator interface configured to receive input from an operator; and
    a control module configured to:
        receive a lower screed input from the operator interface,
        receive a plurality of signals from the plurality of sensors, determine if an object is present in the detection zone based on the plurality of signals, direct the lifting assembly to lower the screed assembly to a lowered position if no object is detected, and if an object is detected:

direct the lifting assembly to stop lowering of the screed assembly, and direct the operator interface to display a warning.

15. The system of claim 14, wherein at least one of the plurality of sensors is located on the tractor portion and at least one of the plurality of sensors is located on the screed assembly.

16. The system of claim 14, wherein at least one of the plurality of sensors is a camera.

17. The system of claim 14, wherein at least one of the plurality of sensors is a thermal sensor.

18. The system of claim 14, wherein the control module is further configured to continue to receive the signals and determine if an object is present in the detection zone until the screed assembly reaches the lowered position.

19. The system of claim 14, wherein at least one of the plurality of sensors is positioned to provide an overhead perspective of the perimeter zone.

\* \* \* \* \*